(12) United States Patent
Bantleon et al.

(10) Patent No.: US 7,143,782 B2
(45) Date of Patent: Dec. 5, 2006

(54) PRESSURE REGULATOR MODULE FOR CONTROLLING A GAS

(75) Inventors: Guenther Bantleon, Leonberg (DE); Thanh-Hung Nguyen-Schaefer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 10/959,285

(22) Filed: Oct. 5, 2004

(65) Prior Publication Data

US 2005/0092369 A1     May 5, 2005

(30) Foreign Application Priority Data

Oct. 6, 2003   (DE) ................. 103 46 208

(51) Int. Cl.
*F16K 31/08*   (2006.01)
(52) U.S. Cl. ............... 137/487.5; 137/486; 137/625.32; 251/65
(58) Field of Classification Search ............ 137/457.5, 137/486, 625.32; 251/65
See application file for complete search history.

(56) References Cited

U.S. PATENT DOCUMENTS

| 17,643 | A | * | 6/1857 | Simmons ............... 137/625.32 |
| 691,529 | A | * | 1/1902 | Brophy ..................... 210/390 |
| 4,909,212 | A | * | 3/1990 | Minowa et al. ............ 123/337 |
| 5,040,501 | A | * | 8/1991 | Lemelson ................ 123/188.3 |
| 5,342,025 | A | * | 8/1994 | Hwang ......................... 251/65 |
| 6,269,838 | B1 | * | 8/2001 | Woodworth et al. ... 137/625.22 |
| 2002/0017322 | A1 | * | 2/2002 | Gagnon ...................... 137/486 |
| 2002/0107461 | A1 | * | 8/2002 | Hui ............................ 601/149 |
| 2003/0209271 | A1 | * | 11/2003 | Decap ..................... 137/487.5 |
| 2004/0144940 | A1 | * | 7/2004 | Seol et al. ............... 251/129.1 |

* cited by examiner

*Primary Examiner*—Eric Keasel
*Assistant Examiner*—Craig Schneider
(74) *Attorney, Agent, or Firm*—Kenyon & Kenyon LLP

(57) ABSTRACT

A pressure regulator module for controlling a gas is provided, which includes a chamber, at least one gas inlet, and at least one gas outlet. In addition, a proportional valve operating essentially according to the pressure-equalization principle is post-connected to the gas inlet and is pre-connected to the chamber, and the proportional valve acts together with a pressure sensor situated in the chamber.

9 Claims, 2 Drawing Sheets

PRESSURE REGULATOR MODULE FOR CONTROLLING A GAS

FIELD OF THE INVENTION

The present invention relates to a pressure regulator module for controlling a gas.

BACKGROUND INFORMATION

A pressure-regulating valve is known in the art, and such a valve includes, for example, a valve controlled by a control unit, using which a gas having a specified pressure may be made available to a downstream user unit. If, for instance, a pulse valve is used, sufficiently good valve dynamics are ensured, but not for all applications.

It is also known in the art that, to prepare a gas having a certain pressure, a pressure regulator module may be equipped with a diaphragm valve. However, a diaphragm valve has a drawback in that it supplies an outlet pressure which is a function of the gas pressure made available at the valve inlet, which may have a disadvantageous effect, particularly in the case of falling inlet pressures.

In motor vehicles which have a gas engine or even a fuel cell, it is necessary to be able to store as great a gas quantity as possible in an appropriate tank. For this purpose, the respective gas, such as natural gas or hydrogen is put under high pressure in a tank, e.g., in the case of a gas engine fueled by natural gas, under a pressure of about 250 bar to 300 bar, and, in the case of a fuel cell fueled by hydrogen, under a pressure of about 700 bar to 750 bar. Downstream from the tank, the gas pressure in each case has to be reduced to a system pressure that is needed by the respective user, e.g., of about 4 bar to 8 bar. As a rule, this is implemented by using a pressure-regulating module of the type described above. During operation, the gas pressure goes down in the respective tank, from a maximum pressure when the tank is full, to a pressure of about 10 to 20 bar.

In the pressure regulating modules that have been used up to this point, this phenomenon disadvantageously changes the dynamics of the modules, since the dynamics are a function of the inlet pressure, and consequently change with the filling state of the tank.

SUMMARY OF THE INVENTION

A pressure regulator module according to the present invention for controlling a gas includes a proportional valve, essentially working according to the pressure-equalizing principle, which valve is post-connected to the gas inlet and acts together with a pressure sensor in the chamber. The pressure regulator module according to the present invention has the advantage that an inlet pressure prevailing at the gas inlet, i.e., the tank pressure, has no influence on the dynamic behavior of the entire pressure regulator module.

The proportional valve has a throttle area which is able to be held variable, so that the mass flow going through the proportional valve is able to be varied by the degree of opening of the throttle area. Especially in comparison to a pressure regulator module having a pulse valve, the pressure regulator module having the gas valve designed as a proportional valve has the advantage that the valve may be constantly opened, and has good valve dynamics as well as being able to deliver a large mass flow.

Because the proportional valve of the pressure regulator module according to the present invention works essentially according to the pressure-equalizing principle, i.e., essentially equalized pressure conditions prevail at the valve seat, only a slight force or a slight torque is required for opening or closing the proportional valve, which is independent of the inlet pressure.

The pressure regulator module according to the present invention may be used in a fuel cell or even in a gas engine of a motor vehicle, and may be used for reducing the gas pressure made available by a tank, to a system pressure required by the respective system, with the outlet pressure and the system pressure being able to be held constant.

In one example embodiment of the pressure regulator module according to the present invention, the proportional valve includes a pot-shaped component designed as a stator having radial openings which act together with radial outflow openings of a piece of pipe designed as a rotor that is rotatable with respect to the pot-shaped component, the pot-shaped component being interconnected to the pipe piece. In this example embodiment, the pot-shaped component may be fixed to one housing of the chamber in such a way that it extends into the chamber, with the piece of pipe, which does not deform even at high pressures such as 750 bar, being rotatable in the pot-shaped component. The piece of pipe may then be either freely rotatable or be limited in its rotatability by stops. The inlet pressure acts upon the entire inner surface of the piece of pipe, so that, in that location, pressure-equalized circumstances prevail.

It is also conceivable that the pot-shaped component may be formed as the rotor and the piece of pipe as the stator.

For the operation of the proportional valve, the pressure regulator module according to the present invention may include an operating unit that may be formed as a magnetic actuator. The magnetic actuator is then coupled to the movable component of the proportional valve, e.g., to the piece of pipe developed as a rotor. Alternatively, instead of a magnetic actuator, an operating unit may also be used which includes an electric motor that engages at the movable component of the proportional valve.

In order to keep down flow leakage in the region of the proportional valve, the pot-shaped component and the piece of pipe of the proportional valve are guided with respect to each other using a slight radial tolerance, e.g., about 5 µm to 10 µm. In addition, it may be expedient for this to develop the guidance range in the circumferential direction between the two components as long as possible.

In order to keep the wear in the region of the proportional valve low, the guidance surfaces between the pot-shaped component and the piece of pipe of the proportional valve may be furnished at least from area to area with a wear-protective layer, e.g., one made of carbon.

For safety reasons, i.e., to protect the chamber and/or component units post-connected to the pressure regulator module from pressures that are too high, in one example embodiment of the pressure regulator module according to the present invention, the chamber is connected to a pressure-limiting valve. The pressure-limiting valve opens if the pressure force exerted by the gas exceeds a preset threshold value which, for example, may lie between 10 bar and 20 bar.

In order to prevent the pressure present at the gas outlet from being submitted to great fluctuations, it is advantageous if a separating wall is provided in the chamber, which wall subdivides the chamber into an intermediate chamber assigned to the proportional valve and an outflow chamber assigned to the outlet. Without the separating wall, large pressure fluctuations may occur in the chamber, which fluctuations may be brought on by high exit speeds of the gas jet at the proportional valve.

DETAILED DESCRIPTION

Figure 1:
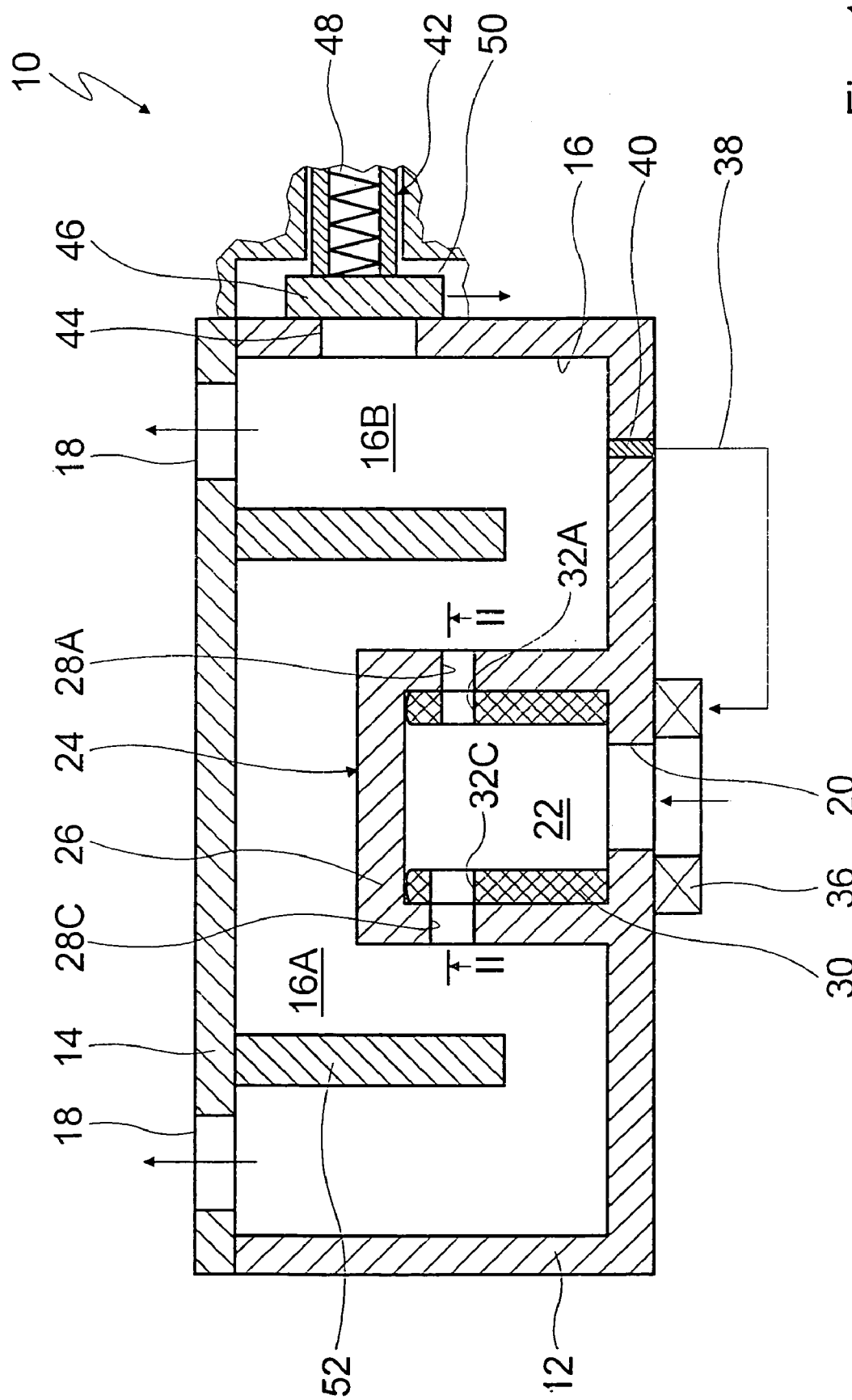
FIG. 1 shows a cross-sectional view through a pressure regulator module according to the present invention.

FIG. 1 shows a pressure regulator module 10 which is designed for use in a fuel cell or in a gas engine of a motor vehicle, and which regulator module is used for regulating a hydrogen flow or a natural gas flow from a gas tank (not shown in greater detail) to a gas valve (also not shown in greater detail).

Pressure regulator module 10 includes a cylindrically designed regulator housing 12 which is closed by a cover 14. Regulator housing 12 and cover 14 define a chamber 16, from which, in the present case, ten outflow bores 18 branch off, each used as a gas outlet, which are formed along a circular line in cover 14.

In the present case, a chamber is post-connected to gas outlets 18 in cover 14, from which there branches off a switching valve which is connected to the user that is to be supplied with gas.

On the floor of cylindrically designed housing 12 an access bore 20 is situated, which bore is developed as a gas inlet, and which leads to an inner chamber 22 of a proportional valve 24.

Proportional valve 24, which is pre-connected to chamber 16, includes a pot-shaped component 26 formed as a stator, which projects into chamber 16, and at the sidewalls of the component 26, divided over the circumference, four radial openings 28A, 28B, 28C and 28D are formed. Pot-shaped component 26 is fixedly connected to the floor of housing 12. In pot-shaped component 26, a cylindrical piece of pipe 30 formed as a rotor is rotatably supported, which has four outflow openings 32A, 32B, 32C and 32D, which each act together with corresponding opening 28A, 28B, 28C and 28D of stator 26.

Figure 2:
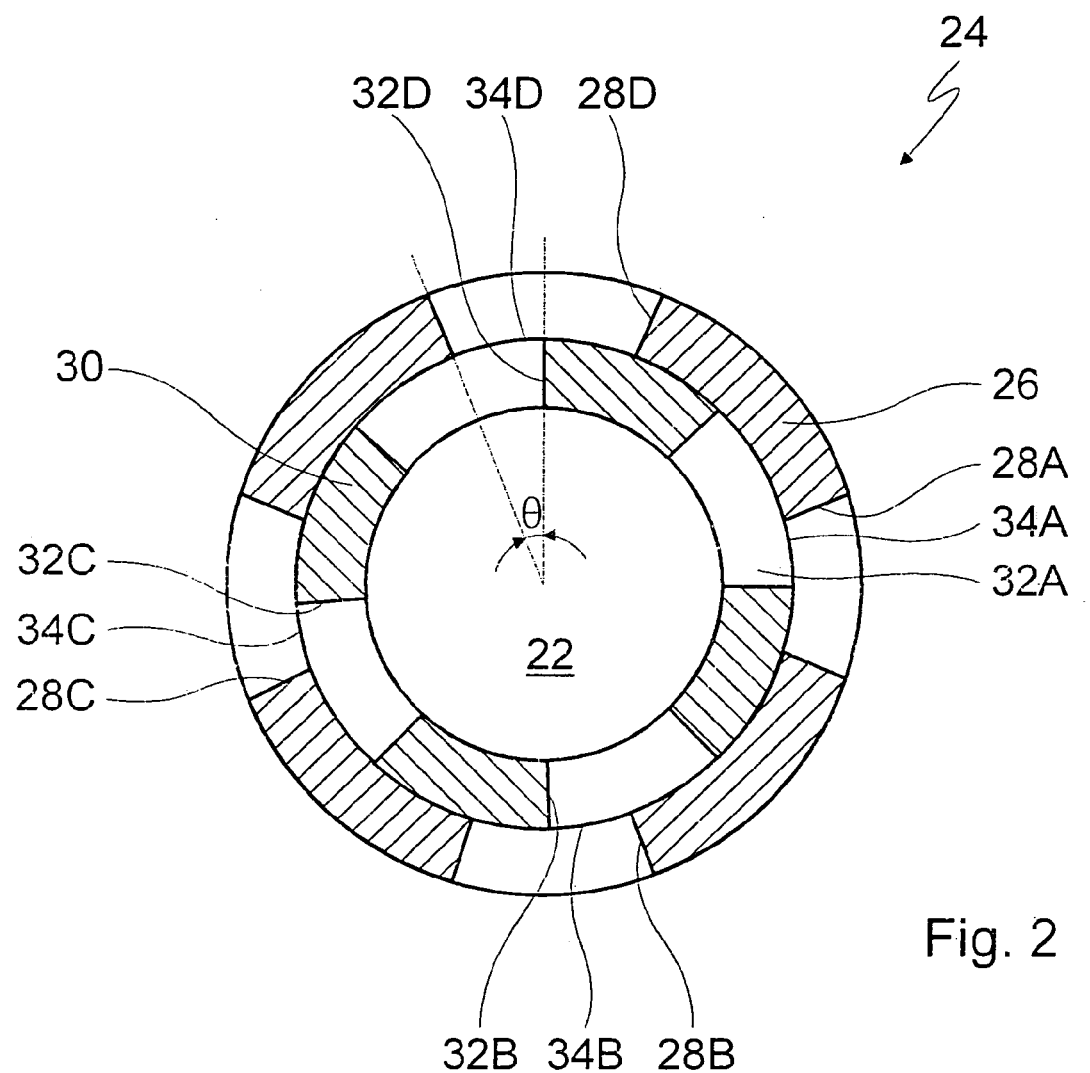
FIG. 2 shows a cross-sectional view through a proportional valve of the pressure regulator module shown in FIG. 1, along a cross-section taken through line II—II shown in FIG. 1.

Because of the positioning of piece of pipe 30 in pot-shaped component 26, as shown in FIG. 2, a so-called opening angle θ may be set which lies between 0° and, in the present case, about 40°, and which determines throttle surfaces or opening surfaces 34A, 34B, 34C and 34D, via the size of which the mass flow is able to be set that is able to flow from inner chamber 22 of proportional valve 26 into chamber 16 of pressure regulator module 10.

The covering surfaces between top-shaped component 24 that is formed as a stator and piece of pipe 30 that is formed as a rotor are selected in such a way that they are larger in the circumferential direction than the maximum length of the opening surfaces 34A, 34B, 34C and 34D. The radial tolerance (or play) between top-shaped component 26 and piece of pipe 30 amounts to about 5 μm to 10 μm. This ensures that a slight flow leakage occurs in the region of proportional valve 24.

Furthermore, the adjacent surfaces of piece of pipe 30 and pot-shaped component 24 are in each case provided with a wear-protective layer made of carbon.

For the operation, i.e., the rotation of piece of pipe 30, proportional valve 24 has an operating unit 36 developed as a magnetic rotary setter, whose control unit is connected to a pressure sensor 40 via a line 38, which is used to measure the gas pressure prevailing in the chamber. In this manner, the degree of opening of opening surfaces 34A, 34B, 34C and 34D are able to be set as a function of the pressure prevailing in chamber 16.

As shown in FIG. 1, chamber 16 is furthermore provided with a pressure limiting valve 42, which is set to a certain limiting pressure such as 10 bar, and which is connected to chamber 16 via a lateral opening 44. Pressure-limiting valve 42 opens if the gas pressure prevailing in chamber 16 exceeds the limiting value that has been set, and pushes a plunger 46 against the force of a spring 48, so that gas may flow out of chamber 16 via lateral opening 44 and a channel 50.

The spring force of spring 48 presets the setpoint value of the pressure prevailing in outflow chamber portion 16B of the chamber 16.

In addition, from cover 14 of housing 12, an annular separating wall 52 projects into chamber 16, and specifically to a height that is below radial openings 28A, 28B, 28C and 28D of proportional valve 24. Separating wall 52 subdivides chamber 16 into an intermediate chamber portion 16A that is assigned to proportional valve 24, and an outflow chamber portion 16B which is assigned to gas outlets 18 or pressure-limiting valve 42. Separating wall 42 acts against pressure fluctuations in outflow chamber portion 16B, so that both gas outlets 18 and pressure-limiting valve 42 are constantly exposed to specified pressure conditions. The pressure sensor is also assigned to outflow chamber portion 16B.

Using pressure regulator module 10, a constant pressure at outlets 18 is able to be maintained in such a way that when there is an increase in pressure in outflow chamber portion 16B, on the one hand, opening surfaces 34A, 34B, 34C and 34D are diminished using operating device 36 and, on the other hand, using pressure-limiting valve 42 the pressure is regulated to the desired setpoint value.

If the gas pressure in outflow chamber portion 16B measured using pressure sensor 40 lies below the setpoint value, opening surfaces 34A, 34B, 34C and 34D are opened to the extent until the setpoint value has set in inflow chamber portion 16B.

What is claimed is:

1. A pressure regulator module for controlling a gas, comprising:
   an enclosed chamber having at least one gas inlet and at least one gas outlet;
   a pressure sensor for measuring a gas pressure prevailing in the chamber; and
   a proportional valve operating according to the pressure-equalization principle, wherein the proportional valve is connected to the chamber and to the gas inlet, and wherein the proportional valve acts in concert with the pressure sensor;
   wherein the proportional valve includes a pot-shaped component formed as a stator and a pipe piece formed as a rotor, the pot-shaped component having radial openings which act together with radial outflow openings of the pipe piece;
   wherein the pipe piece is rotatable with respect to the pot-shaped component;
   wherein the pot-shaped component and the pipe piece concentrically positioned relative to one another; and
   wherein a separating wall is provided in the chamber, the separating wall dividing the chamber into an intermediate chamber portion associated with the proportional valve and an outflow chamber portion associated with the gas outlet.

2. The pressure regulator module as recited in claim 1, wherein selected surface regions having a wear-protective layer are provided between the pot-shaped component and the pipe piece of the proportional valve, wherein the wear-protective layer includes carbon.

3. The pressure regulator module as recited in claim 2, wherein the chamber is connected to a pressure-limiting valve.

4. The pressure regulator module as recited in claim 3, wherein the pressure-limiting valve opens at a preset pressure approximately between 10 bar and 20 bar.

5. The pressure regulator module as recited in claim 1, wherein the chamber is connected to a pressure-limiting valve.

6. The pressure regulator module as recited in claim 5, wherein the pressure-limiting valve opens at a preset pressure approximately between 10 bar and 20 bar.

7. The pressure regulator module as recited in claim 1, further comprising:
an operating unit formed as a magnetic actuator for operating the proportional valve.

8. The pressure regulator module as recited in claim 1, wherein the pot-shaped component and the pipe piece of the proportional valve are concentrically positioned with respect to each other with a radial tolerance of about 5μm to 10 μm.

9. A pressure regulator module as recited in claim 1, wherein a separating wall is provided in the chamber, the separating wall dividing the chamber into an intermediate chamber portion associated with the proportional valve and an outflow chamber portion associated with the gas outlet.

* * * * *